United States Patent [19]
Stippler et al.

[11] Patent Number: 5,794,518
[45] Date of Patent: Aug. 18, 1998

[54] APPARATUS AND DEVICE FOR LAUTERING SECOND WORTS IN BREWING

[75] Inventors: Kurt Stippler, Marzling; Klaus Wasmuht, Ellingen, both of Germany

[73] Assignee: Anton Steinecker Maschinenfabrik GmbH, Freising-Attaching, Germany

[21] Appl. No.: 730,907

[22] Filed: Oct. 18, 1996

[30] Foreign Application Priority Data

Oct. 20, 1995 [DE] Germany .................. 195 39 180.2

[51] Int. Cl.⁶ .................. A23L 1/28; C12G 1/02
[52] U.S. Cl. .................. 99/277.2; 426/29; 426/489; 426/490; 426/495
[58] Field of Search .................. 99/277.2, 277.1, 99/348; 426/29, 431, 489, 490, 495

[56] References Cited

U.S. PATENT DOCUMENTS

| | | | |
|---|---|---|---|
| 4,505,941 | 3/1985 | Raines | 99/277.1 X |
| 4,542,682 | 9/1985 | Hancock | 99/277.1 |
| 4,546,683 | 10/1985 | Wilkinson | 99/277.2 |
| 4,990,346 | 2/1991 | Strippler et al. | 426/29 X |

Primary Examiner—Reginald L. Alexander
Attorney, Agent, or Firm—Seed and Berry LLP

[57] ABSTRACT

The present invention relates to a method and an apparatus for lautering second worts in brewing. According to the invention the hot water needed for the second worts during lautering is introduced via a distributor through which also sludge and/or last runnings and/or first worts are introduced.

11 Claims, 2 Drawing Sheets

APPARATUS AND DEVICE FOR LAUTERING SECOND WORTS IN BREWING

TECHNICAL FIELD

The present invention relates to a method for lautering second worts during brewing in a lauter tun which is provided with a rotatable raking device and a distributor connected thereto for introducing last runnings and/or first worts and/or sludge, the wort which remains in the spent grains after first-wort recovery being washed out by means of hot water applied onto the spent grains from above.

BACKGROUND OF THE INVENTION

In lauter tuns which are equipped with a rotatable raking device and a distributor for introducing last runnings and/or first worts and/or sludge in first-wort recovery, it is known that the hot water required for lautering the second worts is applied by means of sparging apparatus or by means of nozzle systems onto the spent grains. In a system which has for far been used by the applicant and forms the prior art, the upper part of the lauter tun has disposed therein sparging rings which are provided with nozzle openings distributed over the circumference, so that the sparging water can be applied from above to the spent grains over the circumference of the lauter tun.

However, the installation of sparging rings requires corresponding constructional efforts entailing financial costs.

SUMMARY OF THE INVENTION

It is therefore the object of the present invention to provide a method and an apparatus of simple construction offering a more inexpensive solution.

To achieve the object, the hot water for the second worts is introduced via the distributor according to the invention.

It has been found that no difference can be detected within analytical accuracy in the sparging effect or wash-out of the spent grains when the sparging water is introduced on the raking device via the distributors already existing in known lauter tuns. The use of the already existing distributors provides for a substantially cheaper solution without any qualitative loss.

It may be advantageous when the raking machine and the distributor are rotatingly driven during the introduction of hot water. The sparging water is then applied in evenly distributed manner over the circumference due to the rotating drive of the raking machine, so that even at very small flow rates, i.e. when the sparging water flows in slowly, a very uniform distribution over the spent-grains layer is achieved. The raking machine may here be lifted into a position in which the raking knives do not operate in the spent-grains cake; it is however also possible to operate the raking machine in a position in which it is operative at least in part in the spent-grains cake, so that the applied sparging water is directly mixed into the grains cake.

In a lauter tun for performing the method comprising a raking device and a distributor connected thereto for introducing last runnings and/or first worts and/or sludge via ducts leading to the distributor, a hot water duct is connected according to the invention to at least one supply duct leading to the distributor. The sparging water can then be supplied via the hot-water duct during sparging and distributed with the aid of the distributor.

A control valve is preferably positioned in the hot-water duct for controlling the flow rate at a rate suited for the sparging process. A temperature control device may also be arranged in the hot-water duct for adjusting the temperature of the hot water. Normally, a water temperature between 75° and 80° is needed during sparging.

It is of advantage when the distributor comprises a plurality of branches which are directed with their ends towards the bottom of the lauter tun. This effects a further improved distribution of the hot water.

Moreover, it is advantageous when the ends of said branches have arranged thereon baffle plates which divert the inflowing water and prevent the water jet from directly impinging on the spent-grains cake.

BRIEF DESCRIPTION OF THE DRAWINGS

The invention shall be further explained and described in the following text with reference to an embodiment shown in FIGS. 1 and 2.

DETAILED DESCRIPTION OF THE INVENTION

Figure 1:
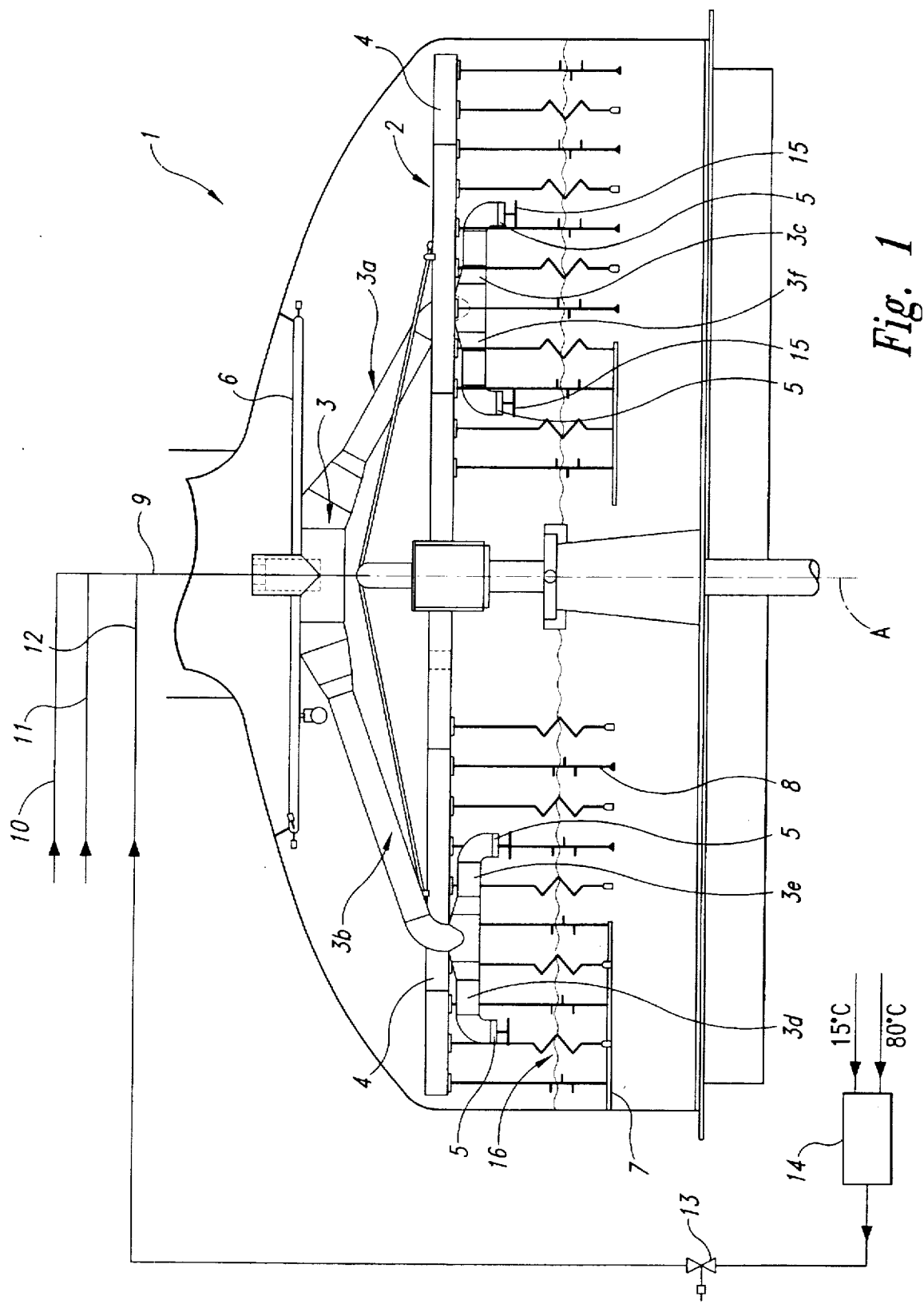
FIG. 1 diagrammatically illustrates a lauter tun in cross-section in accordance with the invention.

FIG. 1 illustrates a lauter tun which is designated by 1 on the whole. The lauter tun has a round circular shape and contains a known raking device 2 in its interior. Raking device 2 is rotatably drivable about a central axis A of the lauter tun and comprises beams 4 which extend from the axis outwardly and which have disposed thereon raking knives 8 and a spent-grains removal means 7. The vertical position of the raking device in lauter tun 1 can be varied, so that the raking knives 8 can operate at different depths in the spent-grains cake (not shown in the figure) settling on the bottom. The spent-grains removal means 7 can be lowered for removing spent grains; otherwise, it is in an upper inoperative position. The lauter tun is filled up to a level 16.

The basic construction of such a lauter tun with a raking device is known. Reference can here be made by way of example to German Utility Model G 86 29 841.

Distributor 3 which in the illustrated embodiment consists of a plurality of branches 3a to 3f that end at different radial distances from axis A in nozzles 5 is supported to rotate together with beams 4 of the raking device 2. A sludge and/or last runnings duct 11 as well as a first wort duct 10 are connected to the supply duct 9 leading to distributor 3. Moreover, according to the invention supply duct 9 has connected thereto a hot water duct 12 through which hot water, which can be produced at a suitable temperature in mixing device 14, can also be supplied to distributor 3.

Baffle plates 15 are arranged at the end of branches 3c to 3f below nozzles 5 for diverting impinging hot water and for ensuring an improved distribution and also for preventing the water jet from directly impinging on the spent-grains cake.

Device 6, which is also shown in the lauter tun, is used for water forerunnings and for cleaning purposes.

Figure 2:
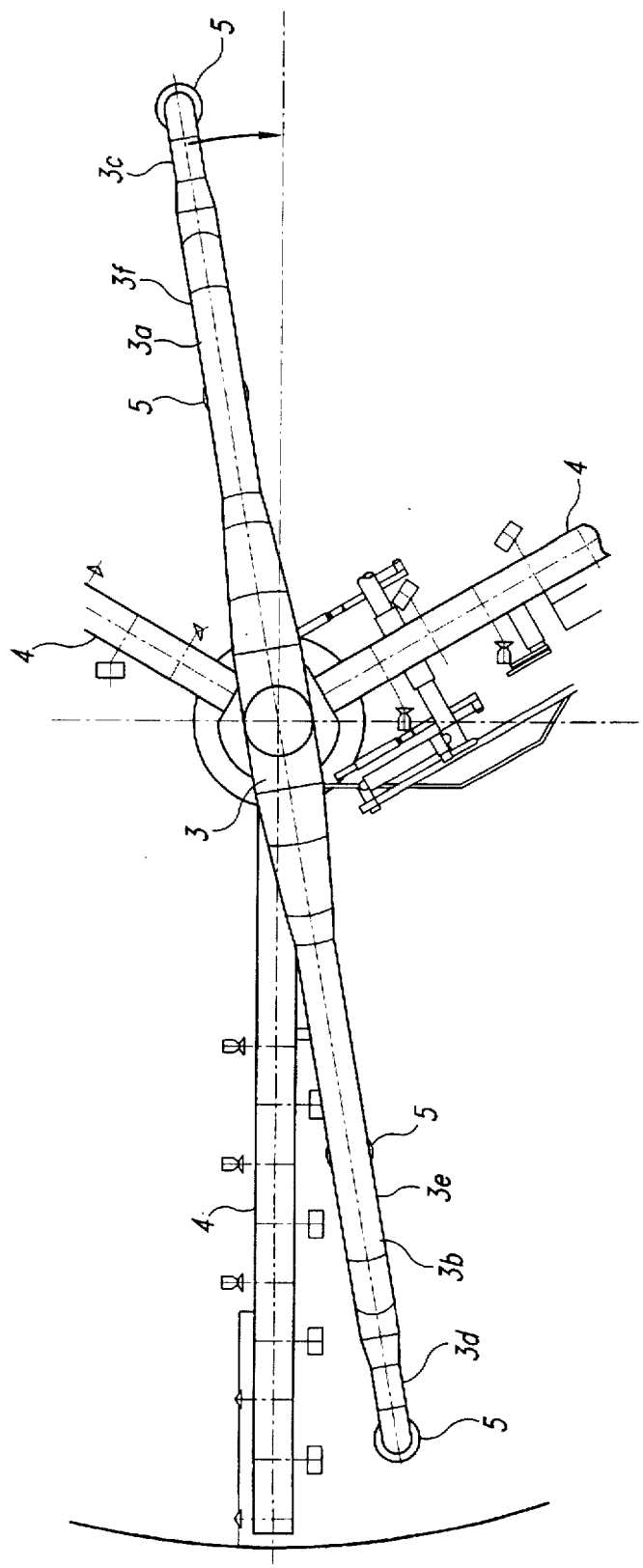
FIG. 2 is a top view on the structure shown in FIG. 1.

The top view on the arrangement in FIG. 2 clearly shows that in this embodiment the raking device 2 comprises three beams 4 that are arranged at an angle of 120° relative to one another. Distributor 3 is arranged in offset relationship therewith, so that hot water can flow thereinto in an unhindered manner. Distributor 3 and beams 4 are interconnected and rotatably supported. As can be seen in FIG. 2, the various nozzles at the ends of branches 3c to 3f have different radial distances from the axis.

It is possible to operate with the lauter tun of such a construction in the following manner:

After mash has been pumped in and stored in the known manner, a spent-grains cake which substantially consists of husks and hulls that are contained in the mash and deposit from the liquor is being formed on the bottom of the lauter tun. During this settling process a turbid mixture of water, wort and bottom dough which is removed by so-called "drawing off" of the wort is located below the false bottom of the lauter tun (the bottom being also not shown). The first wort obtained during this process can be returned via the first-wort duct 10 to supply duct 9 and via distributor 3 into lauter tun 1 again.

Following the lautering of the first wort the second worts or spargings are lautered. The wort remaining in the spent grains after the lautering process, which partly adheres to the surface of the spent-grains particles and is partly retained by swelling and porosity in the interior, must be washed out by hot water. Acording to the invention the hot water required for that process is also introduced into the lauter tun by connection to supply duct 9 via distributor 3 including branches 3a to 3f. The raking device 2 can be rotated here, so that distributor 3 with its branches 3a through 3f rotates together with the raking device, thereby introducing the hot water evenly at different radial distances from axis A via nozzles 5.

A separate sparger which is required in the prior art in the upper part of the lauter tun 1 in the form of sparging rings including nozzles which are distributed over the circumference thereof is thus no longer needed. To be able to perform the sparging operation with the correct hot-water temperatures and quantities, the amount of hot water can be adjusted on control valve 13 and the temperature of the hot water on mixing device 14.

It has been found in tests that no difference can be detected in the sparging effect or wash-out of the spent grains within analytical accuracy. Lautering times, turbidities, operations of the raking machine will, on the whole, yield the same results as if the sparging water had been introduced via a separate sparging device. Hence, it is possible with the invention to achieve the same results with less constructional efforts and thus at reduced costs.

We claim:

1. A method of lautering second worts or spargings during brewing in a lauter tun that is provided with a rotatable raking device and a distributor connected thereto for introducing at least one of the last runnings, first worts and sludge, comprising the steps of washing out the second wort which remains in spent grains after a first wort recovery by introducing hot water to the spent grains through the distributor from above the spent grains, and washing the second wort out of spent grains by means of the hot water that is applied from above onto the spent grains through the distributor.

2. A method according to claim 1, further including the step of rotating the raking device during introduction of said hot water.

3. A method according to claim 2, wherein the step of rotating the raking device during introduction of said hot water includes rotating the raking device at a level where it does not operate in the spent-grains cake.

4. A lauter tun for lautering second worts or spargings during brewing comprising a raking device and a rotatable distributor for introducing one of last runnings, first worts and sludge via supply ducts leading to said distributor, characterized in that a hot water duct is connected to at least one supply duct leading to said distributor.

5. A lauter tun according to claim 4, characterized in that a control valve for controlling the flow rate is arranged in said hot water duct.

6. A lauter tun according to claim 4, characterized in that a mixing device is arranged in said hot-water duct for controlling the temperature of said hot water.

7. A lauter tun according to claim 5, characterized in that a mixing device is arranged in said hot-water duct for controlling the temperature of said hot water.

8. A lauter tun according to claim 4, characterized in that said distributor comprises a plurality of branches which are directed with their ends towards the bottom of said lauter tun.

9. A lauter tun according to claim 5, characterized in that said distributor comprises a plurality of branches which are directed with their ends towards the bottom of said lauter tun.

10. A lauter tun according to claim 6, characterized in that said distributor comprises a plurality of branches which are directed with their ends towards the bottom of said lauter tun.

11. A lauter tun according to claim 7, characterized in that baffle plates are arranged at ends of the distributor for distributing hot water.

* * * * *